(12) United States Patent
Kessler et al.

(10) Patent No.: US 7,533,578 B2
(45) Date of Patent: May 19, 2009

(54) TRIANGULATION WITH CO-LOCATED SENSORS

(75) Inventors: Seth S. Kessler, Waban, MA (US);
Christopher T. Dunn, Salem, MA (US);
Dong-Jin Shim, Cohoes, NY (US)

(73) Assignee: Metis Design Corporation, Cambridge, MA (US)

( * ) Notice: Subject to any disclaimer, the term of this patent is extended or adjusted under 35 U.S.C. 154(b) by 239 days.

(21) Appl. No.: 11/406,662

(22) Filed: Apr. 18, 2006

(65) Prior Publication Data
US 2007/0240515 A1 Oct. 18, 2007

(51) Int. Cl.
*G01M 5/00* (2006.01)
*G01H 11/08* (2006.01)

(52) U.S. Cl. .......................................... 73/802; 73/587

(58) Field of Classification Search .................. 73/583, 73/584, 586, 587, 774–778, 801, 802
See application file for complete search history.

(56) References Cited

U.S. PATENT DOCUMENTS

| | | | |
|---|---|---|---|
| 2,247,246 A | 6/1941 | Lindsay et al. | |
| 3,453,626 A | 7/1969 | Wilson et al. | |
| 3,555,498 A | 1/1971 | Nye et al. | |
| 3,568,198 A | 3/1971 | Borowitz et al. | 343/112 |
| 3,821,740 A | 6/1974 | Ehrlich | 343/100 SA |
| 3,963,677 A | 6/1976 | Enger | 260/28.5 D |
| 3,986,182 A | 10/1976 | Hackett | 340/258 A |
| 4,242,743 A | 12/1980 | Salem | 367/93 |
| 4,890,697 A | 1/1990 | Fischer et al. | 188/1.11 |
| 4,910,464 A | 3/1990 | Trett et al. | 328/5 |
| 4,958,100 A | 9/1990 | Crawley et al. | 310/328 |
| 5,065,629 A | 11/1991 | Koike et al. | 73/602 |
| 5,105,918 A | 4/1992 | Hagiwara et al. | 188/299 |
| 5,111,210 A | 5/1992 | Morse | 342/455 |
| 5,195,046 A | 3/1993 | Gerardi et al. | 364/506 |
| 5,305,507 A | 4/1994 | Dvorsky et al. | 29/25.35 |
| 5,528,557 A | 6/1996 | Horn | 367/129 |
| 5,739,626 A | 4/1998 | Kojima et al. | 310/360 |
| 5,774,376 A | 6/1998 | Manning | 364/508 |
| 6,006,163 A | 12/1999 | Lichtenwalner et al. | 702/36 |

(Continued)

OTHER PUBLICATIONS

Kessler et al., "Damage Detection in Built-Up Composite Structures Using Lamb Wave Methods", *Department of Aeronautics and Astronautics, MIT*, pp. 1-29, Jan. 2002.

(Continued)

*Primary Examiner*—Harshad Patel
*Assistant Examiner*—Punam Patel
(74) *Attorney, Agent, or Firm*—Mintz, Levin, Cohn, Ferris, Glovsky and Popeo, P.C.

(57) ABSTRACT

A method of detecting an event in a structure using a device having sensors and at least one actuator includes sending a signal from the at least one actuator encapsulated in the device, returning a reflected wave signal from the event to each of the sensors in the device, determining a respective duration of time for which the signal travels from the event to each of the sensors, and calculating a location of the event by using differences in the respective durations of time for which the signal travels from the event to each of the sensors to determine an angle and a distance at which the event is positioned.

18 Claims, 5 Drawing Sheets

U.S. PATENT DOCUMENTS

| | | | |
|---|---|---|---|
| 6,370,964 B1 | 4/2002 | Chang et al. | 73/862.046 |
| 6,400,307 B2 | 6/2002 | Fullerton et al. | 342/28 |
| 6,475,639 B2 | 11/2002 | Shahinpoor et al. | 428/614 |
| 6,617,764 B2 | 9/2003 | Sebastian et al. | 310/329 |
| 6,768,312 B2 | 7/2004 | Sun et al. | 324/525 |
| 6,850,788 B2 | 2/2005 | Al-Ali | 600/323 |
| 6,931,173 B1 | 8/2005 | Wang et al. | 385/18 |
| 6,943,484 B2 | 9/2005 | Clark et al. | 310/334 |
| 6,964,201 B2 | 11/2005 | Xu et al. | 73/794 |
| 7,075,424 B1 | 7/2006 | Sundaresan et al. | 340/500 |
| 2003/0009300 A1 | 1/2003 | Giurgiutiu | 702/35 |
| 2004/0012491 A1 | 1/2004 | Kulesz et al. | 340/506 |
| 2004/0126305 A1 | 7/2004 | Chen et al. | 423/447.5 |
| 2004/0151071 A1 | 8/2004 | Kocher | 368/10 |
| 2004/0163478 A1 | 8/2004 | Xu et al. | 73/763 |
| 2005/0011277 A1 | 1/2005 | Guo et al. | 73/826 |
| 2005/0075846 A1* | 4/2005 | Kim | 703/1 |
| 2005/0114045 A1 | 5/2005 | Giurgiutiu et al. | 702/35 |
| 2006/0031426 A1 | 2/2006 | Mesarina et al. | 709/220 |
| 2007/0012111 A1 | 1/2007 | Kim | 73/594 |

OTHER PUBLICATIONS

Kessler et al., "Damage Detection in Composite Materials Using Frequency Response Methods", *Proceedings of the SPIE's 8th International Symposium on Smart Structures and Materials*, Department of Aeronautics and Astronautics, MIT, pp. 1-19, Jan. 2002.

Kessler et al., "Packaging of Structural Health Monitoring Components", MIT, pp. 1-11, Mar. 2004.

Kessler et al., "Selection of Materials and Sensors for Health Monitoring of Composite Structures", pp. 1-10, Dec. 2003.

Kessler et al., "Structural Health Monitoring of Composite Materials Using Piezoelectric Sensors", pp. 1-24, Jan. 2002.

Kessler et al., "In-Situ Damage Detection of Composite Structures using Lamb Wave Methods", *presented to the European Workshop on Structural Health Monitoring*, Jul. 10, 2002; accessed online at http://web.mit.edu/sskess/www/ppt/EWSHM02.pdf on Dec. 22, 2007.

Marantidis et al., "Acoustic-Emission Sensing in an On-Board Smart Structural Health Monitoring System for Military Aircraft", *Proceedings of the SPIE Conference on Smart Structures and Integrated Systems*, 2191:258-264 (1994).

Bar-Cohen, Y., Emerging NDE Technologies and Challenges at the Beginning of the 3rd Millennium—Part I, Part II(13 pgs.) & Part II, Part I (12 pgs.), *Materials Evaluation* (1999).

Chang, F.K., "Structural Health Monitoring: A Summary Report", *Proceedings of the 2nd International Workshop on Structural Health Monitoring*, Stanford, CA, Sep. 8-10, 1999.

Chaumette, D., "Certification Problems for Composite Airplane Structures", *Proceedings of the 6th International European SAMPE Conference*, pp. 19-28 (1985).

Crawley et al., "Use of Piezoelectric Actuators as Elements of Intelligent Structures", *AIAA J.*, 25(10):1373-1385 (1987).

Hall et al., "The Total Data Integrity Initiative ($TDI^2$)—Structural Health Monitoring, The Next Generation", *Proceedings of the USAF*, 2nd ed., pp. 1-25 (1999).

Huber et al., "The Selection of Mechanical Actuators Based on Performance Indices", *Proc. R. Soc. Lond A.*, 453:2185-2205 (1997).

Kessler et al., "Damage Detection in Built-Up Composite Structures Using Lamb Wave Methods", Department of Aeronautics and Astronautics, MIT, pp. 1-29, Jan. 2002.

Kessler et al., "Damage Detection in Composite Materials Using Frequency Response Methods", *Proceedings of the SPIE's 8th International Symposium on Smart Structures and Materials*, Department of Aeronautics and Astronautics, MIT, pp. 1-19 (2002).

Kessler et al., "Damage Detection in Composite Materials Using Lamb Wave Methods", *Proceedings of the American Society for Composites*, Sep. 9-12, 2001, Department of Aeronautics and Astronautics, MIT, pp. 1-24.

Kessler et al., "Design of a Piezoelectric-Based Structural Health Monitoring System for Damage Detection in Composite Materials", *Proceedings of the SPIE's 9th International Symposium on Smart Structures and Materials*, Mar. 2002, Department of Aeronautics and Astronautics, MIT, pp. 1-11.

Kessler et al., "Experimental Application of Optimized Lamb Wave Actuating/Sensing Patches for Health Monitoring of Composite Structures", *Proceedings of the 4th International Workshop on Structural Health Monitoring*, Sep. 15-17, 2003, pp. 1-8.

Kessler et al., "In-Situ Damage Detection of Composites Structures Using Lamb Wave Methods", *Proceedings of the 1st European Workshop on Structural Health Monitoring*, Jul. 2002, Paris, France, pp. 1-9.

Kessler et al., "In-Situ Sensor-Based Damage Detection of Composite Materials for Structural Health Monitoring", *Proceedings of the AIAA/ASME 43rd Structures, Structural Dynamics and Materials Conference*, Apr. 2002, *American Institute of Aeronautics and Astronautics*, pp. 1-11.

Kessler et al., "Optimization of Lamb Wave Actuating and Sensing Materials for Health Monitoring of Composite Structures", *Proceedings of the SPIE's 10th International Symposium on Smart Structures and Materials*, Mar. 3-6, 2003, pp. 1-11.

Kessler et al., "Optimization of Lamb Wave Methods for Damage Detection in Composite Materials", *Proceedings of the 3rd International Workshop on Structural Health Monitoring*, Sep. 12-14, 2001, pp. 1-11.

Kessler et al., "Packaging of Structural Health Monitoring Components", MIT, pp. 1-11 (2004).

Kessler, S.S., "Piezoelectric-Based In-Situ Damage Detection of Composite Materials for Structural Health Monitoring Systems", MIT, Ph.D. thesis, Jan. 2002, pp. 1-200.

Kessler et al., "Selection of Materials and Sensors for Health Monitoring of Composite Structures", pp. 1-10, (2003).

Kessler et al., "Structural Health Monitoring in Composite Materials Using Frequency Response Methods", *Composites Part B*, v. 33, Jan. 2002, pp. 1-11.

Kessler et al., "Structural Health Monitoring in Composite Materials Using Lamb Wave Methods", *Smart Materials and Structures*, v. 11, Apr. 2002, pp. 1-13.

Kessler et al., "Structural Health Monitoring of Composite Materials Using Piezoelectric Sensors", pp. 1-24, (2002).

Khan et al., "Non-Destructive Testing Applications in Commercial Aircrafts Maintenance", NDT.net, 4(6):11 pages (1999).

Lamb, H., "On Waves in an Elastic Plate", *Proceedings of the Royal Society of London*, Part A: Containg Papers of a Mathematicl and pHysical Character, 93(651):114-128 (1916).

Marantidis et al., "Acoustic-Emission Sensing in an On-Board Smart Structural Health Monitoring System for Military Aircraft", *Proceedings of the SPIE Conference on Smart Structures and Integrated Systems*, 2191:258-264 (1994).

Neumair, M., "Requirements on Future Structural Health Monitoring Systems", *Proceedings of the 7th RTO Meetings*, pp. 11-18 (1998).

Shieh et al., "The Selection of Se.'nsors", *Progress in Materials Science*, 46:461-504 (2001).

Srikar et al., "Materials Selection in Micromechanical Design: An Application of the Ashby Approach", *J. Microelectromechan. Systems*, 12(1):3-10 (2003).

Viktorov, I.A., "Rayleigh and Lamb Waves: Physical Theory and Applications", Plenum Press, New York, pp. 1-154 (1967).

Zupan et al., "Actuator Classification and Selection—The Development of a Database", *Advanced Engineering Materials*, 4(12):933-940(2002).

Kessler, S.S., "Certifying a Structural Health Monitoring System: Characterizing Durability, Reliability and Longevity", *Metis Design Corporation*, 7 pgs, Nov. 7-10, 2005.

Kessler et al., "Validation of a Lamb Wave-Based Structural Health Monitoring System for Aircraft Applications", *Metis Design Corporation*, 9 pgs., Mar. 7-10, 2005.

Kessler et al., "An Assessment of Durability Requirements for Aircraft Structural Health Monitoring Sensors", *MIT* (2005).

\* cited by examiner

TRIANGULATION WITH CO-LOCATED SENSORS

BACKGROUND OF THE INVENTION

The determination of near precise location of an object, feature or event is obligatory in various applications, including for radar, sonar, wireless technologies, damage detection, structural health monitoring, positioning or mapping systems, and the like, to perform their function. A common location sensing scheme known as triangulation involves the measurement of distance to an event from a reference point. For triangulation, sensors are placed in at least three separate locales to determine the location of an object situated at a point between the sensors.

Location sensing is particularly useful for damage detection and structural health monitoring (SHM) methods. SHM involves the incorporation of non-destructive test methods into a structure to provide continuous remote monitoring for damage. SHM systems are systems with the ability to detect and interpret adverse changes in a structure, such as an airplane or other aircraft, automobiles, and naval applications, for example. Simple SHM systems that have been implemented in diverse industries generally include the adhesion of strain gauges or thermocouples to monitor changes in strain, frequency and temperature. A common form of SHM that provides minimal data is a "black-box" on aircraft that collect critical flight data.

SUMMARY OF THE INVENTION

The invention relates to the in-plane location triangulation of remote objects, features, events or damage using sensors positioned in substantially close proximity to each other. The sensors are configured to detect objects, features, events or damage that is located at a position outside of the perimeter formed by the sensors.

In general, in an aspect, the invention provides a method of detecting an event in a structure using sensors and at least one actuator. The method includes sending a signal from the at least one actuator encapsulated in a device, returning a reflected wave signal from the event to each of the sensors in the device, determining a respective duration of time for which the signal travels from the event to each of the sensors, and calculating a location of the event by using differences in the respective durations of time for which the signal travels from the event to each of the sensors to determine an angle and a distance at which the event is positioned.

Implementations of the invention may include one or more of the following features. The event may comprise one of an impact event, physical damage or a feature position in a structure. Determining an angle and a distance to an event can comprise employing a duration of time for a first received reflected signal and a last received reflected signal. The method may further include positioning the each of the sensors in substantially even intervals around a circle. A method of detecting a position of a feature in a structure using a device having sensors and at least one actuator can include detecting an acoustic event, returning a reflected wave signal from the event to each of the sensors in the device, determining a respective duration of time for which the signal travels from the event to each of the sensors, and calculating a location of the event by using differences in the respective durations of time for which the signal travels from the event to each of the sensors to determine an angle and a distance at which the event is positioned.

In general, in another aspect, the invention provides a device for use in detecting one of an event or a feature in a structure. The device includes at least three sensors positioned substantially co-planar in a device and an actuator positioned in the device. The device is configured to determine the location of one of an event or a feature by generating a signal and recording a time of flight of the signal with respect to each of the at least three sensors.

Implementations of the invention may include one or more of the following features. The at least three sensors can be configured to measure at least one of stress, strain, vibration, acoustics, temperature, humidity, pressure, acceleration, location, rotation, radiation, electric fields, magnetic fields, light or motion. The actuator can substantially completely surround the at least three sensors. The actuator can be positioned in close proximity to the at least three sensors. The feature can be positioned outside of a perimeter of the actuator that surrounds the at least three sensors. The at least three sensors can substantially completely surround the actuator in the device. The at least three sensors can be positioned in close proximity to the actuator. The feature can be positioned outside of a perimeter of the device comprising the at least three sensors surrounding the actuator.

The invention provides one or more of the following capabilities. Co-located sensors can be used actively to replace phased array methods. Location of an event can be determined within approximately 2 degrees of accuracy. Location of an event can be determined within better than 2 degrees of accuracy. "Halo effect" and "blackout" regions found in traditional phased array can be substantially eliminated. Co-located sensors can be used to replace larger, denser sensor triangulation arrays. The method can be broadly defused in aerospace, automotive, naval and civil applications, or in other fields. Fewer sensors can accomplish detection without limiting the range over which detecting is desired. Co-located sensors can be used in large or in small applications requiring differing power to obtain the desired range and resolution. Embodiments of the invention can use an array of actuator and sensor components, including but not limited to piezoelectric wafers, strain gauges, fiber optics or MEMS devices. A set of sensors in a node can be used passively to determine the location of an impact event using acoustic emission. A set of sensors in a node can actively locate the position (e.g., angle and radius) to a damage feature using Lamb waves or other common ultrasound techniques.

Other capabilities will be apparent upon a review of the Figures and Detailed Description that follows.

DETAILED DESCRIPTION OF THE INVENTION

The features and other details of the invention will now be more particularly described. It will be understood that particular embodiments described herein are shown by way of illustration and not as limitations of the invention. The principal features of this invention can be employed in various embodiments without departing from the scope of the invention.

Embodiments of the invention are directed to co-located sensors in a single package used to determine the position (angle and radius) of an impact event or damage feature located outside of the sensor package using triangulation methods. Embodiments of the invention can be directed to piezoelectric-based sensors and an actuator that are positioned in close proximity to one another and can be packaged within a single unit and share a common hardware infrastructure. Embodiments of the invention can be used in facilitating damage detection, non-destructive testing ("NDT"), radar, sonar and structural health monitoring ("SHM"). Embodiments of the invention relate to a collection of electrical and mechanical components necessary to conduct in-situ damage detection methods. Embodiments of the invention can be used in SHM of aircraft, spacecraft, naval vessels and automobiles. Embodiments of the invention may be used in other structures using sensor networks and to conduct testing procedures other than NDT and SHM procedures. For example, embodiments of the invention can be used for non-destructive evaluation, measurement, usage monitoring (HUMS), security, surveillance, condition monitoring, quality control, radar or cell phone networks. Embodiments of the invention can be used for other applications.

Figure 1:
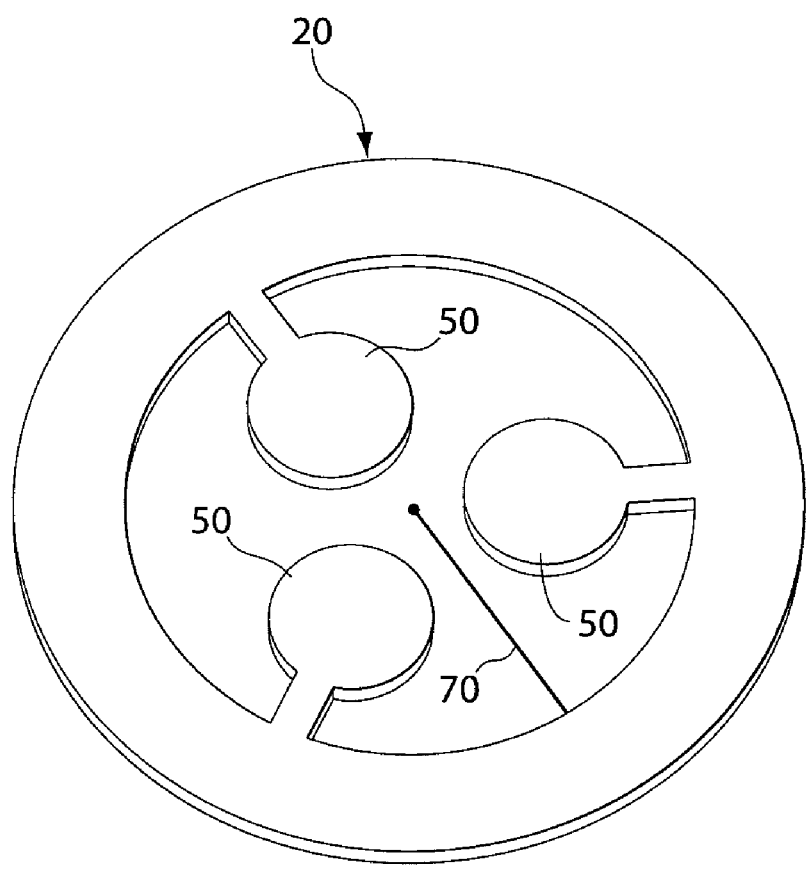
FIG. 1 is a top perspective view of co-located sensors used in a damage detection device fabricated by laser cutting a PZT-5A wafer, for example.

Referring to FIG. 1, a sensor node 5 is comprised of a piezoelectric wafer 20, sensors 50 and an actuator 60. The wafer 20 has a radius 70. The sensors 50 are preferably positioned equidistant from each other around a perimeter of the piezoelectric wafer 20. For example, a circular wafer 20 having a radius 70 includes sensors 50 positioned at equal distances around the perimeter of the wafer 20. The sensors 50 are substantially close in proximity to one another, and in proximity to the actuator 60.

Figure 2:
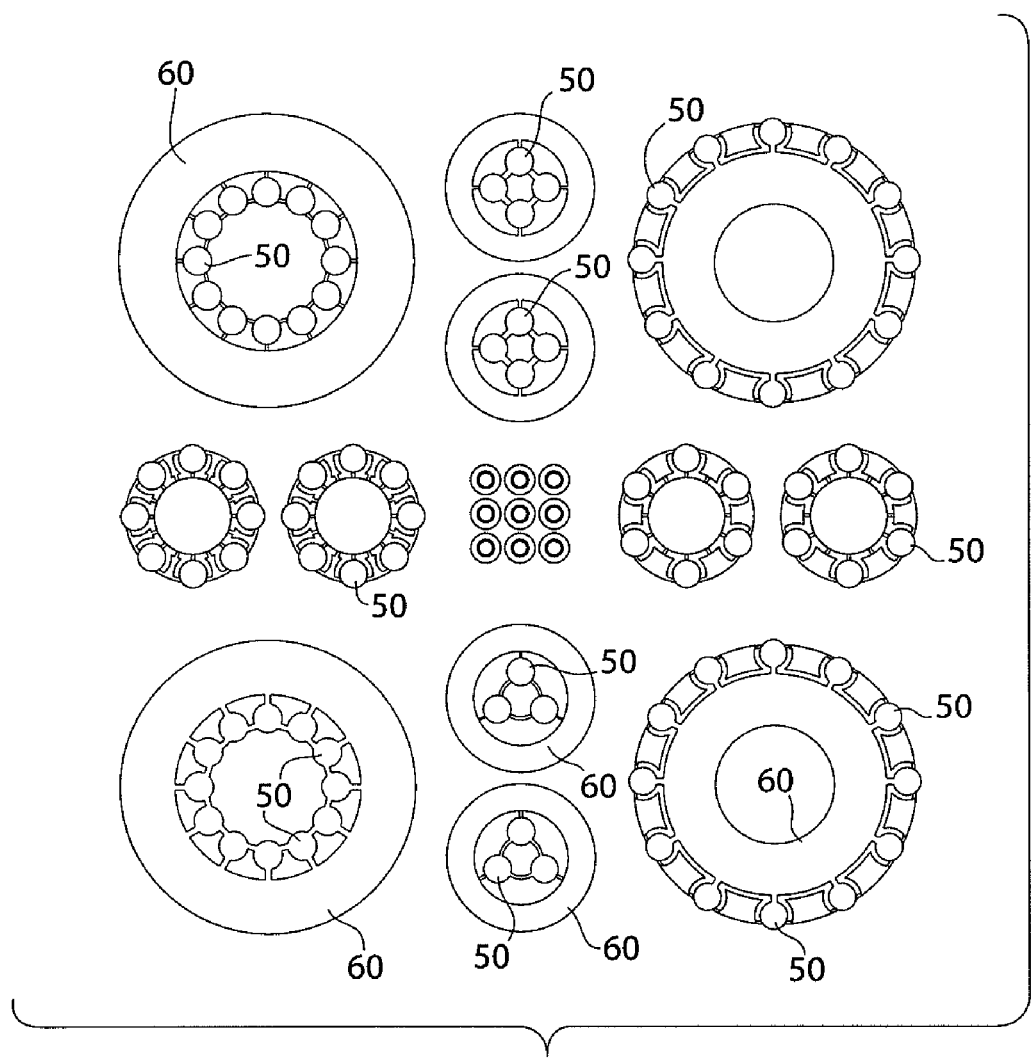
FIG. 2 is a schematic of exemplary alternative sensor/actuator configurations.

The node 5 comprises the at least three co-located sensors 50 that allow triangulation using reflected signals. The sensors 50 and the actuator 60 are substantially in-plane components capable of connection to a circuit without the use of wires. For example, the node 5 can include components, such as those components described in co-pending U.S. application Ser. No. 11/071,129 filed Mar. 3, 2005 and entitled, "Sensor Infrastructure," and Ser. No. 11/071,856 filed Mar. 3, 2005 and entitled, "Damage Detection Device," each of which is herein incorporated by reference. Referring to FIG. 2, the co-located sensors 50 and the actuator 60 can be a number of alternative shapes and configurations. For example, the sensors 50 can be circular, semicircular, square, triangular, rectangular, pie-shaped, hexagonal, octagonal, and any of a number of other shapes. Three sensors 50 or greater than three sensors 50 can be used to optimize the location detection. The actuator 60 can also be any of a number of shapes configured to be planar to the sensors 50. The substantially concentric design of the sensors 50 and the actuator 60 provide omni-directional operation of the node 5. By having an actuator that surrounds a set of sensors (or vice versa) this allows excited signals (electrical, magnetic, acoustic, vibrational or otherwise) to be emanated omni-directionally from a nearly point source, and for response measurements to be taken from nearly that same location.

Each of the sensors 50 and the actuator 60 can surround, or substantially surround the other. In each of the alternative configurations shown in FIG. 2, the center portion can be the actuator 60, surrounded by one or more than one sensor 50. Thus, a sensor or a set of sensors can be surrounded by an actuator or a set of actuators. Alternatively, an actuator or a set of actuators can be surrounded by a sensor or a set of sensors in the concentric design.

The in-plane configuration of the actuator 60 and the co-located sensors 50 achieves contact with a material to be monitored or tested using thermoset or thermoplastic tape, epoxy, using a couplant material, or with an externally applied force. Other room temperature or elevated cure methods of contact are possible and envisioned. In some applications, the co-located sensors 50 and the actuator 60 are encapsulated in a housing. In other embodiments, the node 5 is substantially directly positioned on a material or structure for use. The actuator 60 and the co-located sensors 50 can be actuated with an electrical or magnetic field being applied so as to excite through-thickness, axial, shear or radial modes in the actuator. This field can be applied to a parallel face of the actuator 60, or using interdigitated electrode patterns. Sensor voltage data can be measured using any of these fields. Preferably, the sensors 50 and the actuator 60 are constructed of a piezo-ceramic material. Other known materials can be used, however, such as other piezoelectric materials (PVDF, PMA, etc), piezoresistive materials or magnetorestrictive materials, for example.

The particular piezoelectric material used for the wafer 20 can be PZT-5A in order to reduce the dependency of performance on temperature, however other grades of PZT such as PZT-5H would also be acceptable. The piezoelectric elements are either injection molded, machined or micro-fabricated in either addition or subtraction processes into the desired geometry, typically less than 1" in diameter. Other dimensions are possible and envisioned, and may vary depending on optimizing an application.

A variety of sensor types can be used to accomplish triangulation, including, but not limited to, sensors that measure stress, strain, vibration, acoustics, temperature, humidity, acceleration, radiation, electric or magnetic fields, light and/or motion. Further, a node 5 can be surface-mounted or embedded for applications that include, for example, structural health monitoring, non-destructive evaluation, health usage monitoring, surveillance or security.

Sizes of the nodes can vary. For example, sensors 50 may include an actuator ranging from a 1" diameter to a 0.1" diameter. Sensors can range from 0.2" diameter with 0.01" spacing, to 0.02" diameter with 0.001" spacing. Other dimensions for the sensors and the actuator are possible. For example, the diameters of the sensors and the actuators, and the spacing between the sensors, can be greater than or less than the dimensions stated above. The ratio of the dimensions can be optimized based on predicted performance. Nodes 5 can utilize between 3 and 6 sensors, or more than 6 sensors, inside of an actuator ring, for example.

Figure 3A:
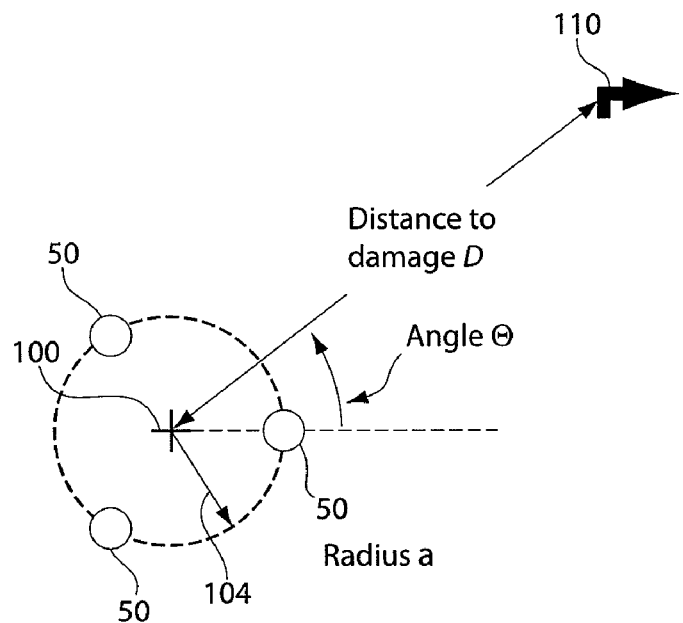
FIG. 3A is a schematic of a measurement of distance and angle to an event using co-located sensors.

Referring to FIG. 3A, the actuator 60 is configured to excite waveforms in a material to create reflected waves that the co-located sensors 50 measure. The actuator 60 excites a radial Lamb wave mode, which propagates omni-directionally from the source location. The sensors 50 are positioned to measure a time of arrival difference from waves reflected from feature locations (e.g., damage) in order to triangulate a location of an event or feature positioned outside of the perimeter defined by the sensors 50 and the actuator.

The distance to an event 110 can be calculated according to various methodologies. For example, in a first in-first out method of determining the position of the event 110, a time of flight of the signal sent from the point 100 is recorded for each of the sensors positioned around the circle 102. A vector is drawn between the sensors 50 with the longest and the shortest times of flight to calculate a distance D to the event 110. The method described with respect to FIG. 3A can increase in accuracy as additional sensors are added to a node.

Alternatively, the co-located sensors 50 can be used in a triangulation method to determine the distance D to the event 110. Sensors 50 are positioned in even increments around a circle, for example, 3 sensors are positioned 120-degrees apart from one another around a circle. For each combination of 3 sensors, a triangularization calculation is performed, finding the Cartesian coordinates to determine the recorded times of flight using distance formulas. Each of the combinations are compared and the combinations of results that yield the highest confidence levels are averaged to produce a final feature position.

Figure 3B:
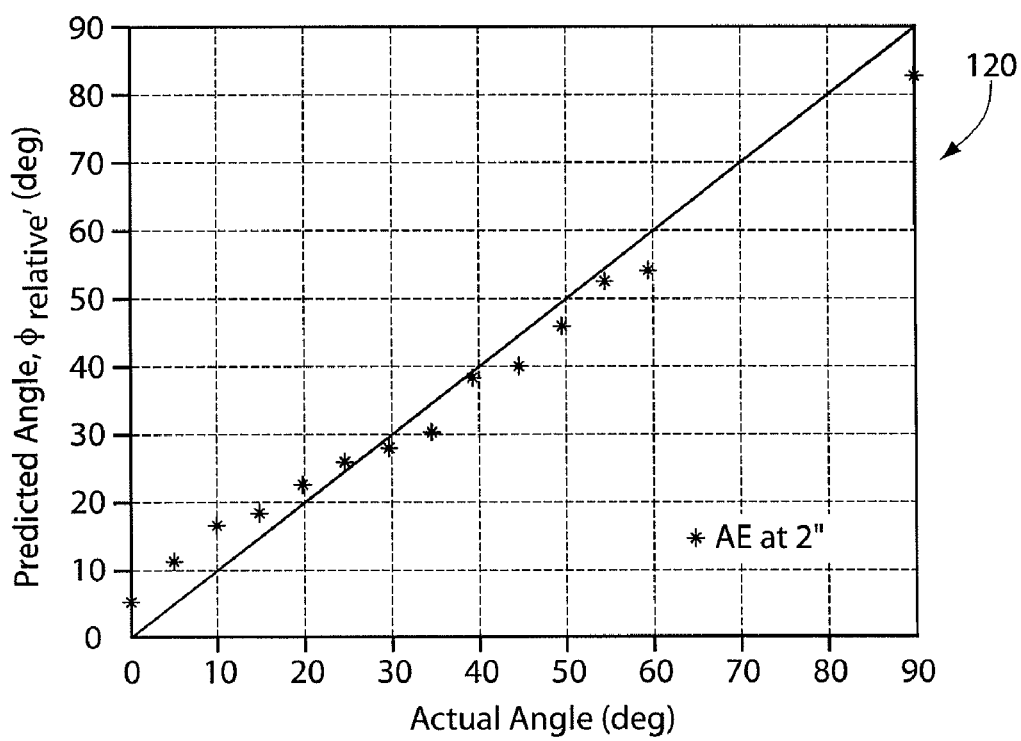
FIG. 3B is a graph of experimental results comparing co-located measurements that measure angle to a damage feature with the actual angle using the method of FIG. 8A.

For example, according to experimentation, the triangulation method yields substantially accurate results for a small number of sensors. Increasing the number of sensors by more than 3 marginally increases resolution, which was experimentally validated for 3-6 sensors. Referring to FIG. 3B, experiments were conducted using the triangulation technique. A plot 120 represents results of testing of a single actuator and 3 sensors positioned on a 1'×1' aluminum plate with markings at 1-degree increments. A 1-kilogram weight was placed on the plate using shear couplant to represent a feature. The weight was placed in several known positions prior to collecting data, in order to compare measured angle-to-damage, with the known angle-to-damage. Distance to the damage was also displayed, using the average time of flight recorded by all sensors to calculate the position. From these experiments, an error of less than 5 degrees was observed. Further processing and experimental optimization allowed for a reduction in the error to 2 degrees, or less. Experimental implementation of a passive version of the system shown in FIGS. 3A and 3B has yielded substantially similar results. Experimentation of the passive system was conducted using a pencil tip broken in various locations on the plate. The co-located sensors are capable of determining the location with identical accuracy without the use of an actuator.

Figure 4:
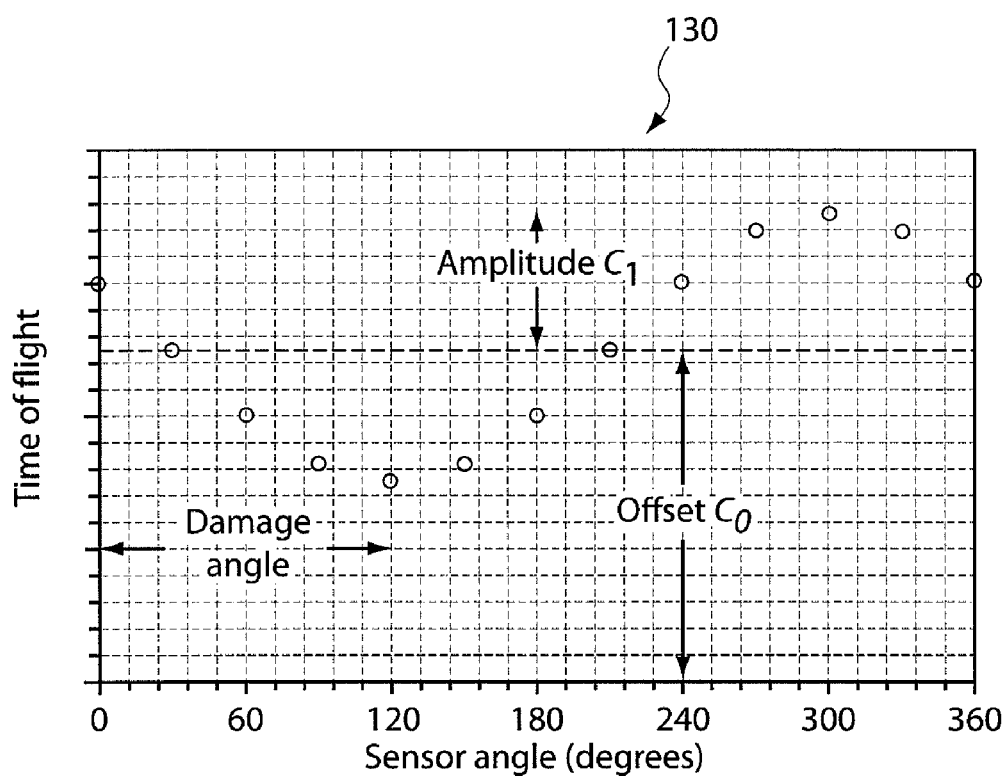
FIG. 4 is a plot demonstrating the Fourier technique for calculating an angle to a feature.

Referring to FIG. 4, in an additional alternative method of calculating a distance to an event, a Fourier transform can be used in the calculation of the position of the feature, impact event or damage. The sensors 50 are positioned around the radius of a circle. The sensors 50 are used to plot the time of arrival results in cylindrical coordinates, plot 130. A Fourier transform is used to approximate the closest sinew wave that would match this data using the values for amplitude, offset, phase and sensor angle. Once the sine wave has been interpolated, a traditional triangularization method can be used to calculate the feature position based on the implied times of flights for the fixed sensor locations.

Figure 5:
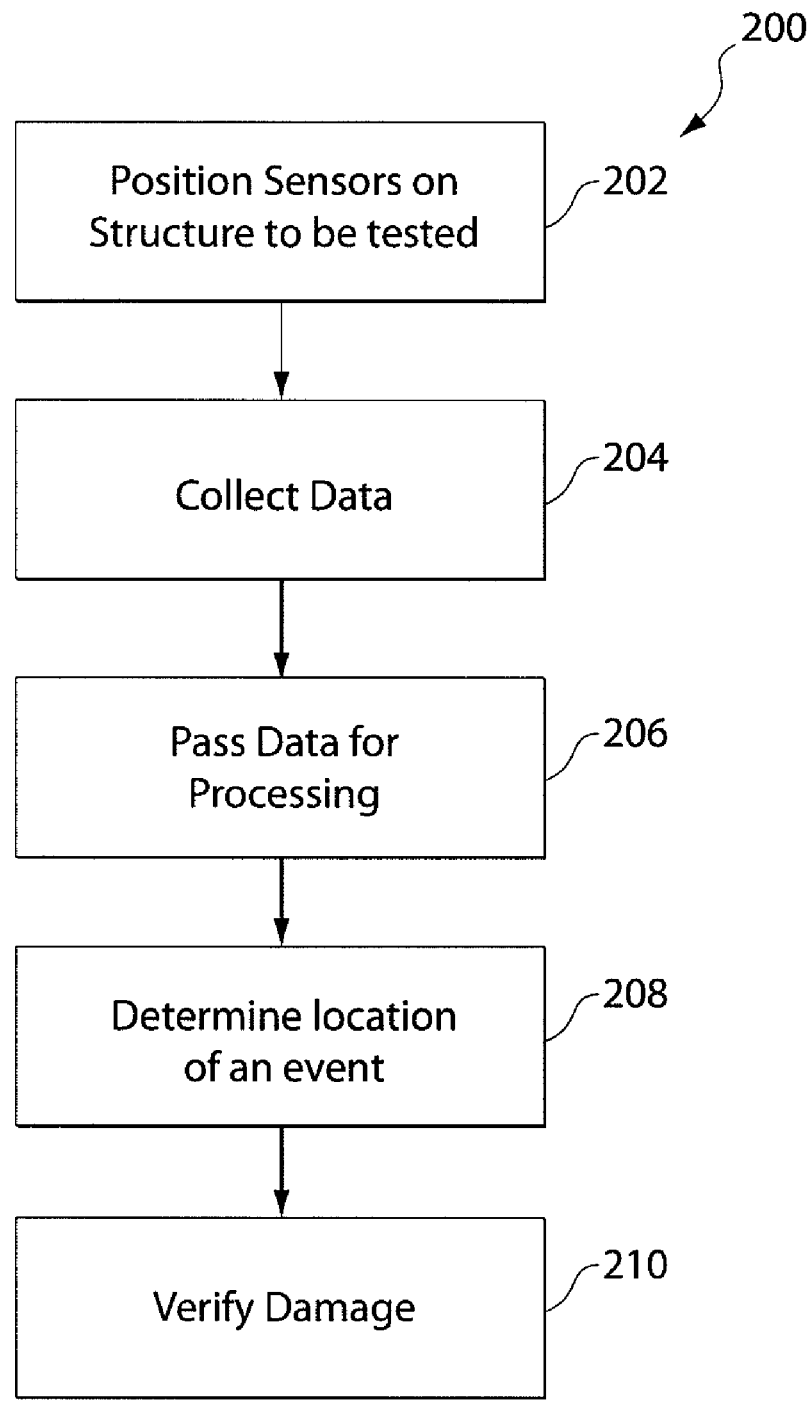
FIG. 5 is a flow chart representing a method of determining a distance to an event according to an embodiment of the invention.

In operation, referring to FIG. 5, with further reference to FIGS. 1-4, a process 200 for detecting a feature, such as damage or an impact event in a material or structure, using a node 5 having multiple sensors includes the stages shown. The process 200, however, is exemplary only and not limiting. The process 200 may be altered, e.g., by having stages added, removed, or rearranged.

At stage 202, a node 5 is positioned on the surface of a material or a structure for which structural integrity is to be tested or monitored. A single node comprises one or more actuators 60, and a number of sensors 50. For example, a node 5 contains three sensors 50 equidistant from each other around a perimeter of the node 5, circumscribed by a ring actuator 60. The node 5 can be embedded in a material or structure to conduct detection. The node 5 can be used to locate other features or events, such as in a radar or sonar application. Although the system can operate continuously, the system can be accessed on demand, for example, to conserve power and computation needs.

At stage 204, the node 5 collects data related to the structure to which it is affixed. The node 5 can collect data actively (e.g., pulse and listen), or passively, for example, using strain and acoustic emission methods. Passive damage detection methods can be used continuously to sense the presence of an impact to the structure. Passive methods are generally those that operate by detecting responses due to perturbations of ambient conditions. Acoustic emission can be performed passively to detect and record impact events and approximate the energy of impact.

Active methods such as Lamb wave techniques can give more information about the type and severity, in addition to the location of damage. Active methods, for example, use an externally supplied energy in the form of a stress or electromagnetic wave to function. Examples of active methods include, but are not limited to, electrical and magnetic impedance measurements, eddy currents, optical fibers that use a laser light source, modal analysis and Lamb wave propagation. At stage 206, the nodes pass the collected information to a local processing unit At stage 208, the position of damage is determined using the data collected, and using algorithms to triangulate feature locations from a single point. For example, a node 5 having three or more sensors 50 equally spaced about a circle having a given radius can record the time of flight of a signal sent to the event for each sensor 50. The time of flight of the signal is used to calculate a position of the event with respect to the position of the sensor 50. More than three sensors can be used in a node to detect the location of an event.

At stage 210, the collected and processed data is displayed to the user for verification. The display is possible using any of a number of methods, for example, through LED indicators, text reports or graphically. It is also possible to set up feedback with the system being monitored for action to take place based upon the results. Data may be communicated to a central location (e.g., ground crew), locally (e.g., operator), or to other nodes for collaboration via data fusion, for example.

In embodiments of the invention, structural monitoring tests are facilitated with the electronics on a printed circuit board. A microprocessor can be encapsulated in the node 5 to initiate testing by triggering the arbitrary function generator to excite the actuator in the node 5 and initiating data collection by a datalogger on the printed circuit board. The tests can be initiated remotely by a user, pre-programmed to be executed at certain intervals, or run substantially continuously. Digital data from the buffer is collected by a central processor via a wired or wireless data link. The data is processed by a central processor. The microprocessor on the printed circuit board can provide processing to locally assess damage.

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

The invention claimed is:

1. A method of detecting an event in a structure using sensors and at least one actuator, the method comprising:
   sending a signal from the at least one actuator encapsulated in a device;
   returning a reflected wave signal from the event to each of the sensors encapsulated in the device;
   determining a respective duration of time for which the signal travels from the event to each of the sensors; and
   calculating a location of the event by using differences in the respective durations of time for which the signal travels from the event to each of the sensors to determine an angle and a distance at which the event is positioned.

2. The method of claim 1, wherein the event comprises one of an impact event, physical damage and a feature position in a structure.

3. The method of claim 1 wherein determining an angle and a distance to an event comprises employing a duration of time for a first received reflected signal and a last received reflected signal.

4. The method of claim 1 further comprising positioning the each of the sensors in substantially even intervals around a circle.

5. The method of claim 1 further comprising positioning the each of the sensors in substantially even intervals around a circle.

6. A device for use in detecting one of an event or a feature in a structure, the device comprising:
   at least three sensors positioned substantially co-planar in an encapsulation; and
   an actuator positioned in the encapsulation;
   wherein the device is configured to determine the location of one of an event or a feature by generating a signal and recording a time of flight of a reflected portion of the signal with respect to each of the at least three sensors; and
   wherein the encapsulation is configured to attach to the structure.

7. The device of claim 6 wherein the at least three sensors are configured to measure at least one of stress, strain, vibration, acoustics, temperature, humidity, pressure, acceleration, location, rotation, radiation, electric fields, magnetic fields, light and motion.

8. The device of claim 6 wherein the actuator substantially completely surrounds the at least three sensors.

9. The device of claim 8, wherein the actuator is positioned in close proximity to the at least three sensors.

10. The device of claim 8, wherein the feature is positioned outside of a perimeter of the actuator that surrounds the at least three sensors.

11. The device of claim 6 wherein the at least three sensors substantially completely surround the actuator in the device.

12. The device of claim 11, wherein the at least three sensors are positioned in close proximity to the actuator.

13. The device of claim 11, wherein the feature is positioned outside of a perimeter of the device comprising the at least three sensors surrounding the actuator.

14. A method of detecting an event in a structure using sensors and at least one actuator, the method comprising:
   sending a signal from the at least one actuator encapsulated in a device;
   returning a reflected wave signal from the event to each of the sensors encapsulated in the device;
   determining a respective duration of time for which the signal travels from the event to each of the sensors; and
   calculating an angular vector at which the event is positioned using differences in the respective durations of time for which the signal travels from the event to each of the sensors.

15. The method of claim 14 further comprising calculating a distance at which the event is positioned using the respective durations of time for which the signal travels from the event to at least one of the sensors.

16. The method of claim 14 further comprising calculating a distance at which the event is positioned using the intersection of angular vectors calculated using at least two of the device.

17. The method of claim 14, wherein the event comprises one of an impact event, physical damage and a feature position in a structure.

18. The method of claim 14 wherein determining the angular vector comprises employing a duration of time for a first received reflected signal and a last received reflected signal.

* * * * *

UNITED STATES PATENT AND TRADEMARK OFFICE
CERTIFICATE OF CORRECTION

PATENT NO. : 7,533,578 B2  Page 1 of 1
APPLICATION NO. : 11/406662
DATED : May 19, 2009
INVENTOR(S) : Seth S. Kessler, Christopher T. Dunn and Dong-Jin Shim It is certified that error appears in the above-identified patent and that said Letters Patent is hereby corrected as shown below:

Col. 7, line 32 In Claim 5, line 1, please change "Claim 1" to --Claim 14--

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,533,578 B1 | Page 1 of 1 |
| APPLICATION NO. | : 11/406662 | |
| DATED | : May 19, 2009 | |
| INVENTOR(S) | : Kessler et al. | |

It is certified that error appears in the above-identified patent and that said Letters Patent is hereby corrected as shown below:

On the cover page,

Item [*] Notice:   Subject to any disclaimer, the term of this patent is extended or adjusted under 35 USC 154(b) by 239 days.

Delete the phrase "by 239 days" and insert -- by 270 days --

Signed and Sealed this

First Day of June, 2010

David J. Kappos
*Director of the United States Patent and Trademark Office*